(12) United States Patent
Takeda et al.

(10) Patent No.: US 11,376,994 B2
(45) Date of Patent: Jul. 5, 2022

(54) VEHICLE SEAT

(71) Applicant: Tachi-S Co., Ltd., Tokyo (JP)

(72) Inventors: Masakazu Takeda, Tokyo (JP); Keita Myochin, Tokyo (JP); Naoki Toda, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 17/177,472

(22) Filed: Feb. 17, 2021

(65) Prior Publication Data

US 2021/0402893 A1 Dec. 30, 2021

(30) Foreign Application Priority Data

Jun. 29, 2020 (JP) .............................. JP2020-111810

(51) Int. Cl.
*B60N 2/12* (2006.01)
(52) U.S. Cl.
CPC .................... *B60N 2/123* (2013.01)
(58) Field of Classification Search
CPC ..... B60N 2/1615; B60N 2/1675; B60N 2/544
USPC ................................... 297/344.14
See application file for complete search history.

(56) References Cited

U.S. PATENT DOCUMENTS

| 2,175,452 A | * | 10/1939 | Whedon | B60N 2/1892 297/344.14 |
| 4,092,009 A | * | 5/1978 | Koutsky | B60N 2/1615 248/421 |
| 5,154,402 A | * | 10/1992 | Hill | B60N 2/502 248/429 |
| 7,984,950 B2 | * | 7/2011 | Hoshi | B60N 2/1675 297/344.12 |

FOREIGN PATENT DOCUMENTS

JP 2017-197075 A 11/2017

* cited by examiner

*Primary Examiner* — Sarah B McPartlin
(74) *Attorney, Agent, or Firm* — Morgan, Lewis & Bockius LLP

(57) ABSTRACT

Provided is a vehicle seat having a pitching function, which not only has an assist function for bringing a main frame to a seated position or a forward tilted position, but also prevents the increase in the width and the increase in the weight of the seat. The vehicle seat includes: a base frame; a main frame disposed on the base frame and having a back frame and a cushion frame; and a link mechanism that allows the main frame to swing to the seated position and the forward tilted position with respect to the base frame. A third rotating shaft of the link mechanism is provided with a torsion spring that urges the main frame to swing from the forward tilted position to the seated position.

7 Claims, 11 Drawing Sheets

VEHICLE SEAT

BACKGROUND

Field

The present invention relates to a vehicle seat.

Description of Related Art

Some vehicle seats have a so-called pitching function that allows an entire seat body including a seatback (backrest portion) and a seat cushion (seat portion) to be tilted forward (see Patent Publication JP-A-2017-197075). With this function, even when, for example, a child safety seat is attached to the seat, the entire seat body can be tilted forward, whereby an occupant can board and be seated in the rear seat.

SUMMARY

Incidentally, in a vehicle seat having the pitching function described above, a relatively strong force is required to bring the seat body from the forward tilted position to the seated position or from the seated position to the forward tilted position due to the center of gravity and the weight of the seat body. Therefore, an assist function may be helpful to bring the seat body to the seated position or the forward tilted position.

In this regard, the vehicle seat of Patent Publication JP-A-2017-197075 is equipped with an assisting means that applies an assisting force for displacing the main frame (including the back frame and the cushion frame), which is the framework of the seat body, from the forward tilted position to the seated position, although intended to suppress a delayed lock of the seat lock mechanism. However, the assisting means has a massive mechanism including, e.g., a coil spring extending in a front-rear direction and a hook for fixing the coil spring, and this mechanism is located outside a fixing position of a seat sliding device in a vehicle width direction. Thus, the width of the vehicle seat becomes wide, narrowing the space for boarding and seating in the rear seat when the seat is tilted forward. Furthermore, the seat becomes heavy and only moves from the forward tilted position to the seated position.

The present invention has been contrived in view of the foregoing points, and an object thereof is to provide a vehicle seat having a pitching function, which not only has an assist function for bringing a main frame to a seated position or a forward tilted position, but also prevents the increase in the width and the increase in the weight of the seat.

A vehicle seat according to one aspect of the present invention includes: a base frame; a main frame disposed on the base frame and having a back frame and a cushion frame; and a link mechanism that allows the main frame to swing to a seated position and a forward tilted position with respect to the base frame, wherein at least one rotating shaft of the link mechanism is provided with a spring that urges the main frame to swing from the forward tilted position to the seated position or from the seated position to the forward tilted position.

According to this aspect, the spring provided on at least one rotating shaft of the link mechanism can urge the main frame to swing from the forward tilted position to the seated position or from the seated position to the forward tilted position. Thus, the vehicle seat with a pitching function not only has an assist function for bringing the main frame to the seated position or the forward tilted position but also prevents the increase in the width and the increase in the weight of the seat.

In the foregoing aspect, the link mechanism may be provided in pairs on both left and right sides of the main frame, and the spring may be provided on each of a pair of left and right rotating shafts of the link mechanism.

In the foregoing aspect, the base frame has slide rails that are located on both left and right sides of the main frame respectively and that slide the main frame in a front-rear direction, and the spring is provided at the same position as the slide rail in a front view or at a position on an inside of the slide rail in a left and right direction.

The base frame may have a first frame extending in the front-rear direction, and the link mechanism may have the cushion frame, the first frame, and a front link, a rear portion of the cushion frame and a rear portion of the first frame may be connected to each other via a first rotating shaft, a front portion of the cushion frame and a first end portion of the front link may be connected to each other via a second rotating shaft, a front portion of the first frame and a second end portion of the front link may be connected to each other via a third rotating shaft, and the cushion frame may be provided with a long hole that allows the first rotating shaft or the second rotating shaft to swing.

The spring may be provided on at least the third rotating shaft, or the first or second rotating shaft that is not provided with the long hole.

According to the present invention, the vehicle seat with a pitching function not only has an assist function for bringing the main frame to the seated position or the forward tilted position but also prevents the increase in the width and the increase in the weight of the seat.

DETAILED DESCRIPTION

Figure 1:
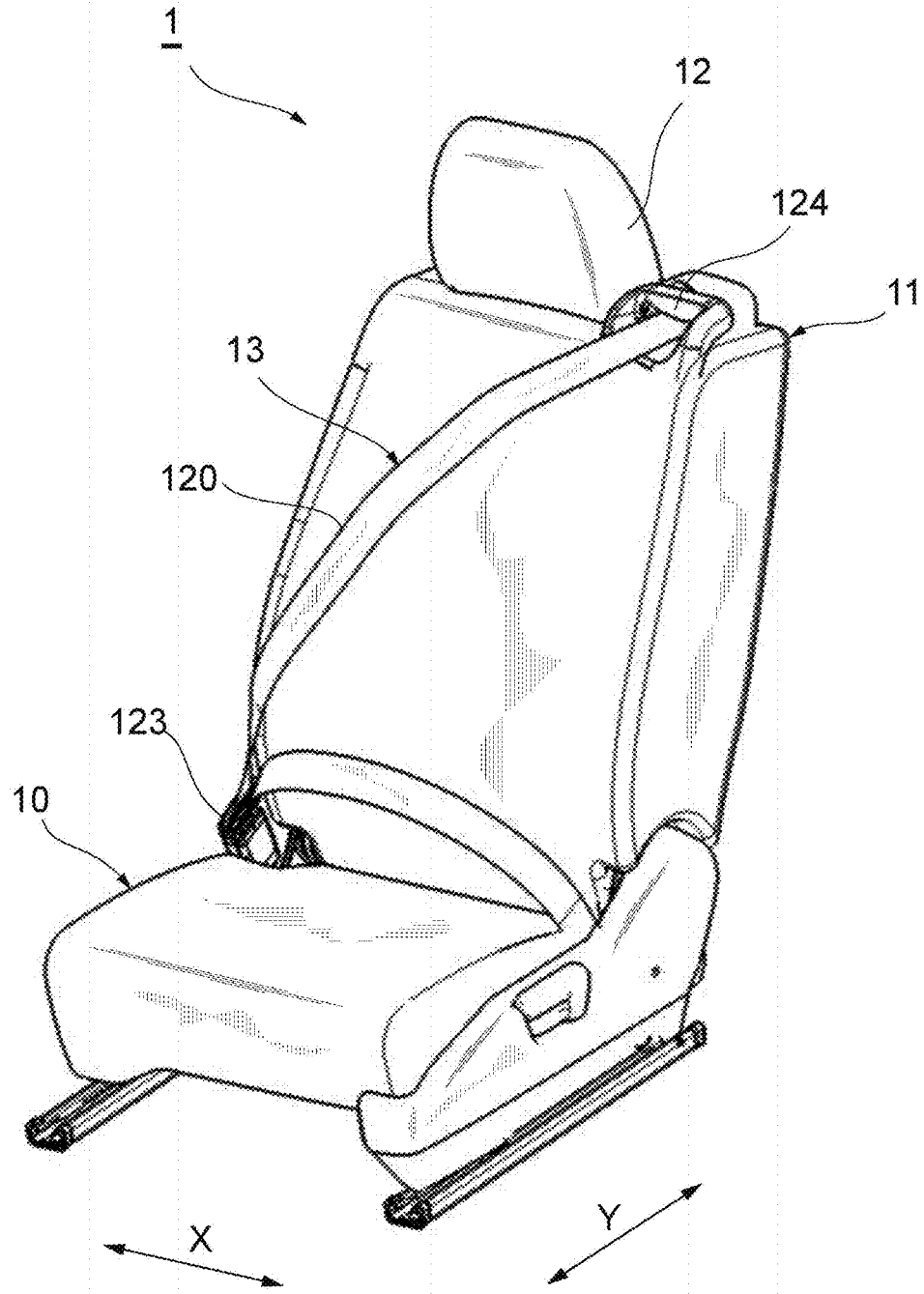
FIG. 1 is a perspective view showing an example of a configuration of a vehicle seat.

Preferred embodiments of the present invention are described hereinafter with reference to the drawings. The same elements are provided with the same reference numerals, and overlapping descriptions are omitted accordingly. In addition, the positional relationship such as up, down, left, and right shall be based on the positional relationship shown in the drawings unless otherwise specified. Furthermore, the dimensional ratios in the drawings are not limited to the ratios illustrated. Also, the following embodiments are examples for explaining the present invention; the present invention is not limited thereto.

FIG. 1 is a perspective view showing an example of a configuration of a vehicle seat 1 according to the present embodiment. For example, the vehicle seat 1 includes a seat cushion 10 on which an occupant sits, a seatback 11 against which the occupant leans back, a headrest 12 that supports the head of the occupant, a seat belt device 13, and the like.

Figure 2:
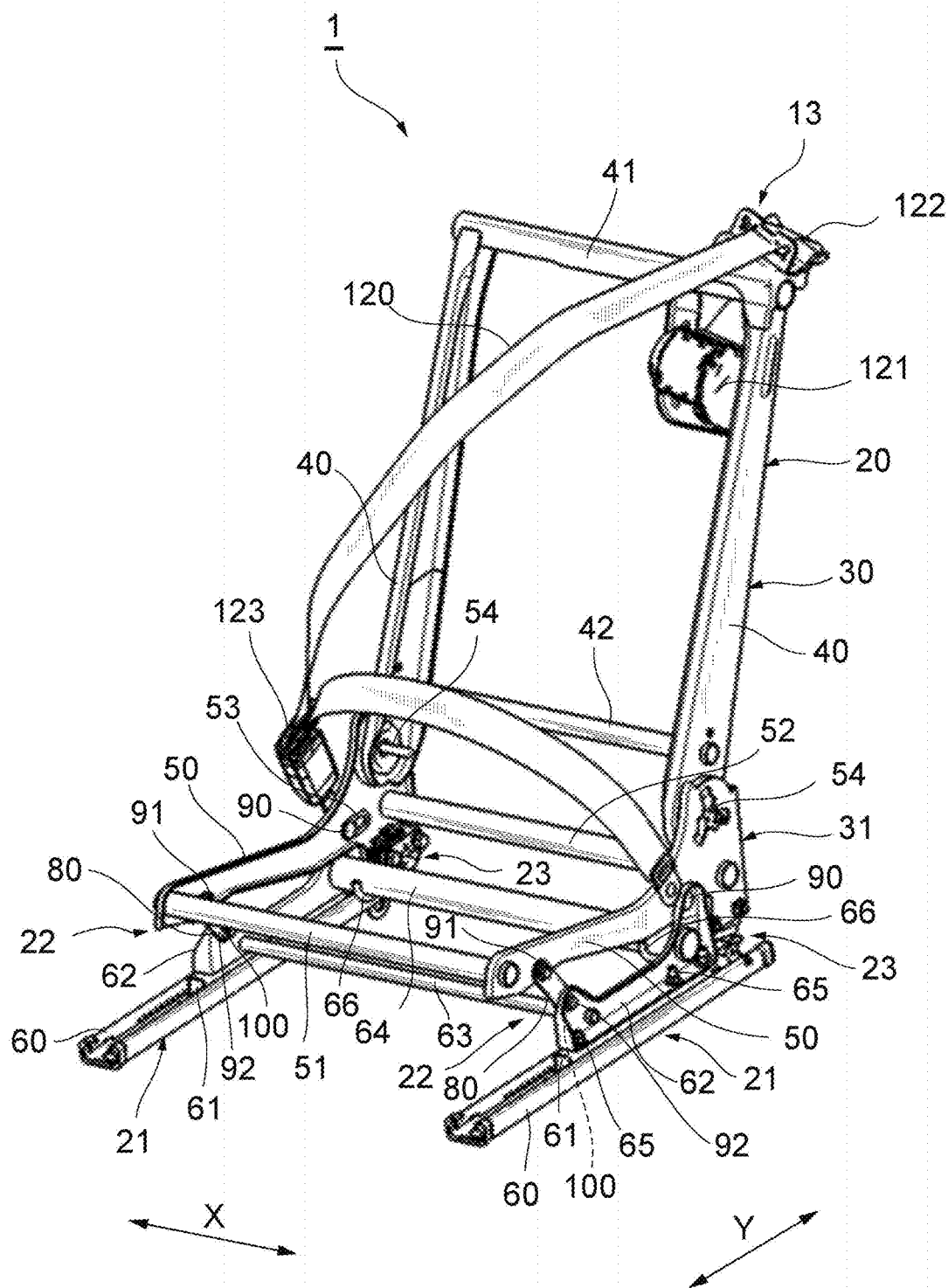
FIG. 2 is a perspective view showing an example of a framework of the vehicle seat.

FIG. 2 is a perspective view showing an overview of a framework of the vehicle seat 1. The vehicle seat 1 includes, as the framework thereof, for example, a main frame 20, a base frame 21, link mechanisms 22 that allow the base frame 21 to swing to a seated position and a forward tilted position with respect to the main frame 20, and lock mechanisms 23. The seated position means a position where the occupant sits normally (the position shown in FIGS. 1 to 3).

The main frame 20 has a back frame 30 corresponding to a framework of the seatback 11, and a cushion frame 31 corresponding to a framework of the seat cushion 10.

The back frame 30 has, for example, side frames 40, an upper connecting frame 41, and a lower connecting frame 42.

The side frames 40 are provided in pairs on both sides of the vehicle seat 1 in a lateral direction (vehicle width direction) X, and extend in a vertical direction. The side frames 40 each have, for example, a plate shape that is long in the vertical direction and has a plate surface thereof facing in the lateral direction X. The upper connecting frame 41 extends horizontally in the lateral direction X and connects upper end portions of the pair of side frames 40 to each other. The lower connecting frame 42 extends horizontally in the lateral direction X and connects lower portions of the pair of side frames 40 to each other.

The cushion frames 31 have, for example, side frames 50, a front connecting frame 51, and a rear connecting frame 52.

Figure 3:
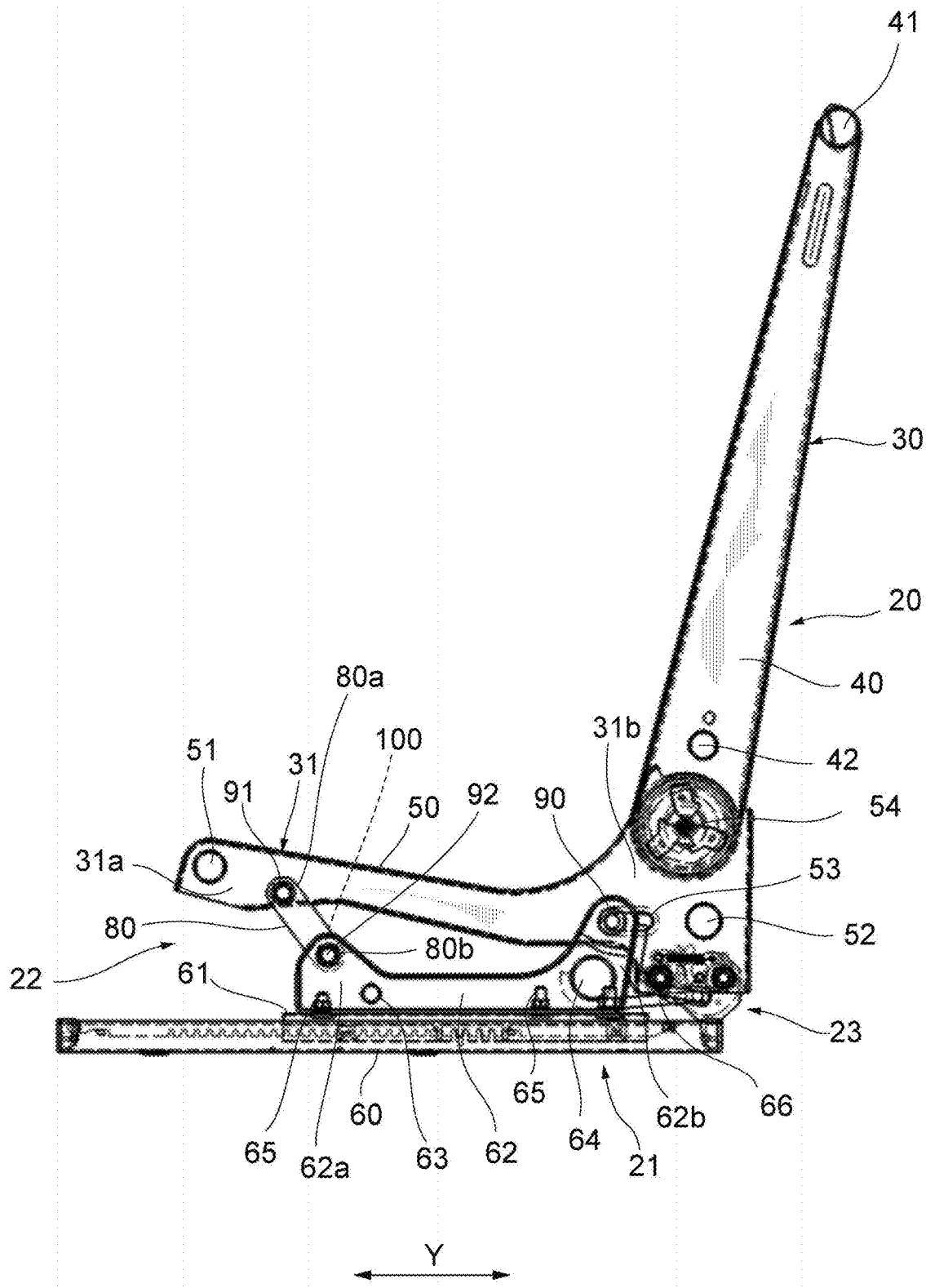
FIG. 3 is a side view showing an example of the framework of the vehicle seat in which a main frame is in a seated position.

The side frames 50 are provided in pairs on both sides of the vehicle seat 1 in the lateral direction X, and extend in a front-rear direction (front-rear direction of the vehicle) Y of the vehicle seat 1. As shown in FIGS. 2 and 3, the side frames 50 each have, for example, a plate shape that is long in the front-rear direction Y and has a plate surface thereof facing in the lateral direction X. The side frames 50 each have, for example, an approximately constant vertical width from a front portion to a middle portion, but the vertical width expands from the middle portion to a rear portion. The side frames 50 are each shaped to protrude upward at the rear portion. At the rear portion of each of the side frames 50, a long hole 53 that penetrates in the lateral direction X and is elongated in the front-rear direction Y is formed, the long holes 53 being used in the link mechanisms 22.

As shown in FIG. 2, the front connecting frame 51 extends horizontally in the lateral direction X and connects the front portions of the pair of side frames 50 to each other. The rear connecting frame 52 extends horizontally in the lateral direction X and connects rear portions of the pair of side frames 50 to each other.

The lower portions of the side frames 40 of the back frame 30 and the rear portions of the side frames 50 of the cushion frame 31 are rotatably connected by rotating shafts 54 arranged in the lateral direction X. The rotating shafts 54 are each provided with a reclining mechanism, not shown, which can tilt the back frame 30 forward and backward with respect to the cushion frame 31.

The base frame 21 has, for example, slide rails each composed of a lower rail 60 and an upper rail 61, risers 62 as first frames, a front connecting frame 63, and a rear connecting frame 64.

The lower rails 60 are fixed to a floor surface of the vehicle. The lower rails 60 are provided in pairs on both sides of the vehicle seat 1 in the lateral direction X and extend linearly in the front-rear direction Y. The upper rails 61 are provided on the respective lower rails 60 so as to be slidable in the front-rear direction Y. The upper rails 61 each have an elongated shape that is long in the front-rear direction Y.

The risers 62 are provided in pairs on both sides of the vehicle seat 1 in the lateral direction X, and each have a plate shape that is long in the front-rear direction Y and have a plate surface thereof facing in the lateral direction X. Front and rear portions of each riser 62 each have a wider vertical width than a middle portion of the same. The front and rear portions of each riser 62 have a shape that protrudes upward. The risers 62 are located on the upper rails 61 and fixed to the upper rails 61 by fixing members 65 such as bolts. As shown in FIG. 3, the fixing members 65 are provided in two sections: in front of a third rotating shaft 92 of each link mechanism 22, which is described hereinafter, and between the third rotating shaft 92 and the first rotating shaft 90 in the front-rear direction Y.

As shown in FIG. 2, the front connecting frame 63 extends horizontally in the lateral direction X and connects the front portions of the pair of risers 62 to each other. The front connecting frame 63 has, for example, a cylindrical shape. As shown in FIG. 3, the front connecting frame 63 is located closer to the third rotating shafts 92 of the respective link mechanisms 22 which are described hereinafter, between the third rotating shafts 92 and the first rotating shafts 90 in the front-rear direction Y. The front connecting frame 63 functions as a stopper for stopping the side frames 50 of the cushion frame 31 when the side frames 50 are lowered by the link mechanisms 22, that is, as a stopper for stopping the main frame 20 from moving from the seated position to the forward tilted position.

As shown in FIG. 2, the rear connecting frame 64 extends horizontally in the lateral direction X and connects the rear portions of the pair of risers 62 to each other. The rear connecting frame 64 has, for example, a cylindrical shape having a diameter larger than that of the front connecting frame 63.

Figure 7:
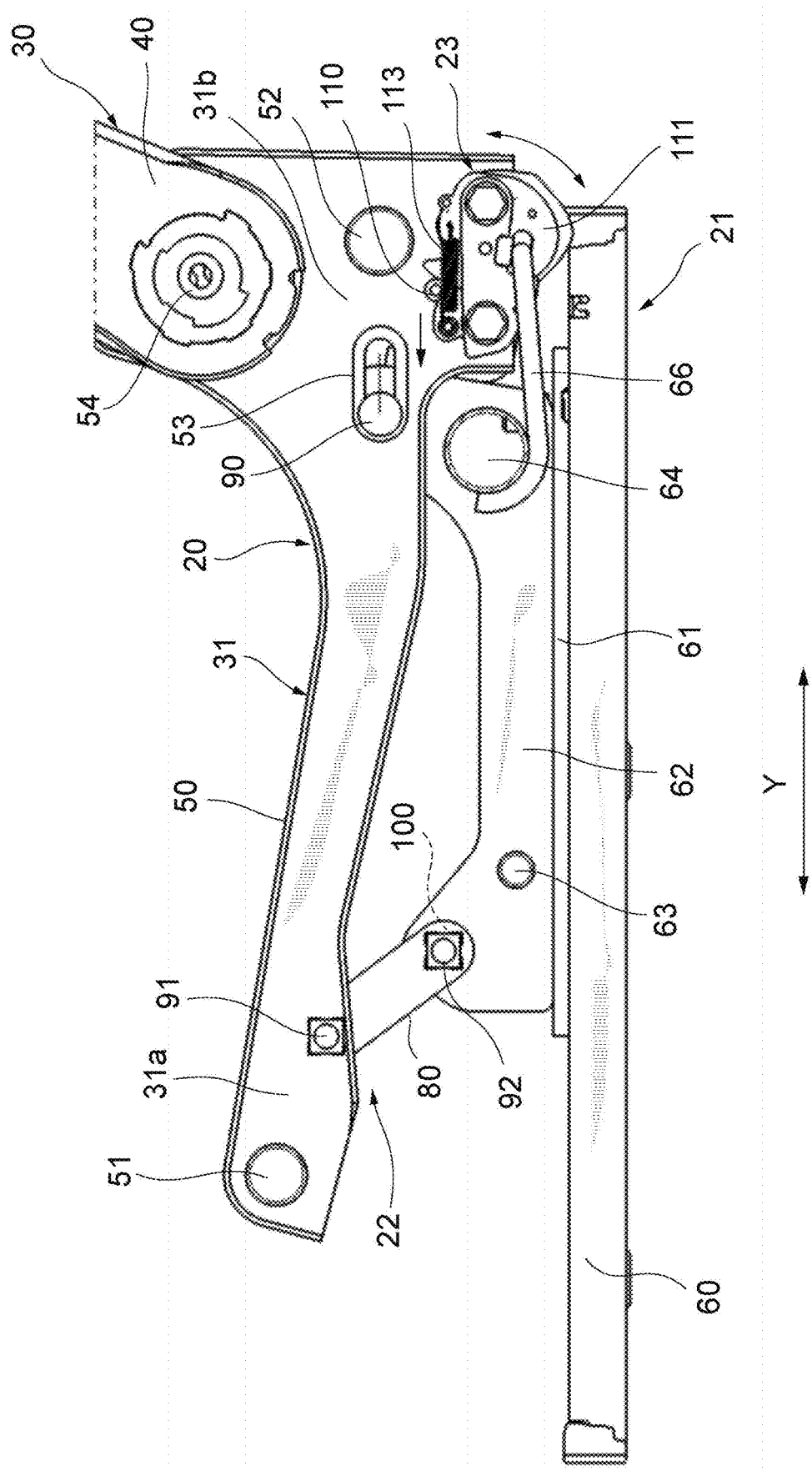
FIG. 7 is a side view showing the main frame in the seated position from the inside.
Figure 8:
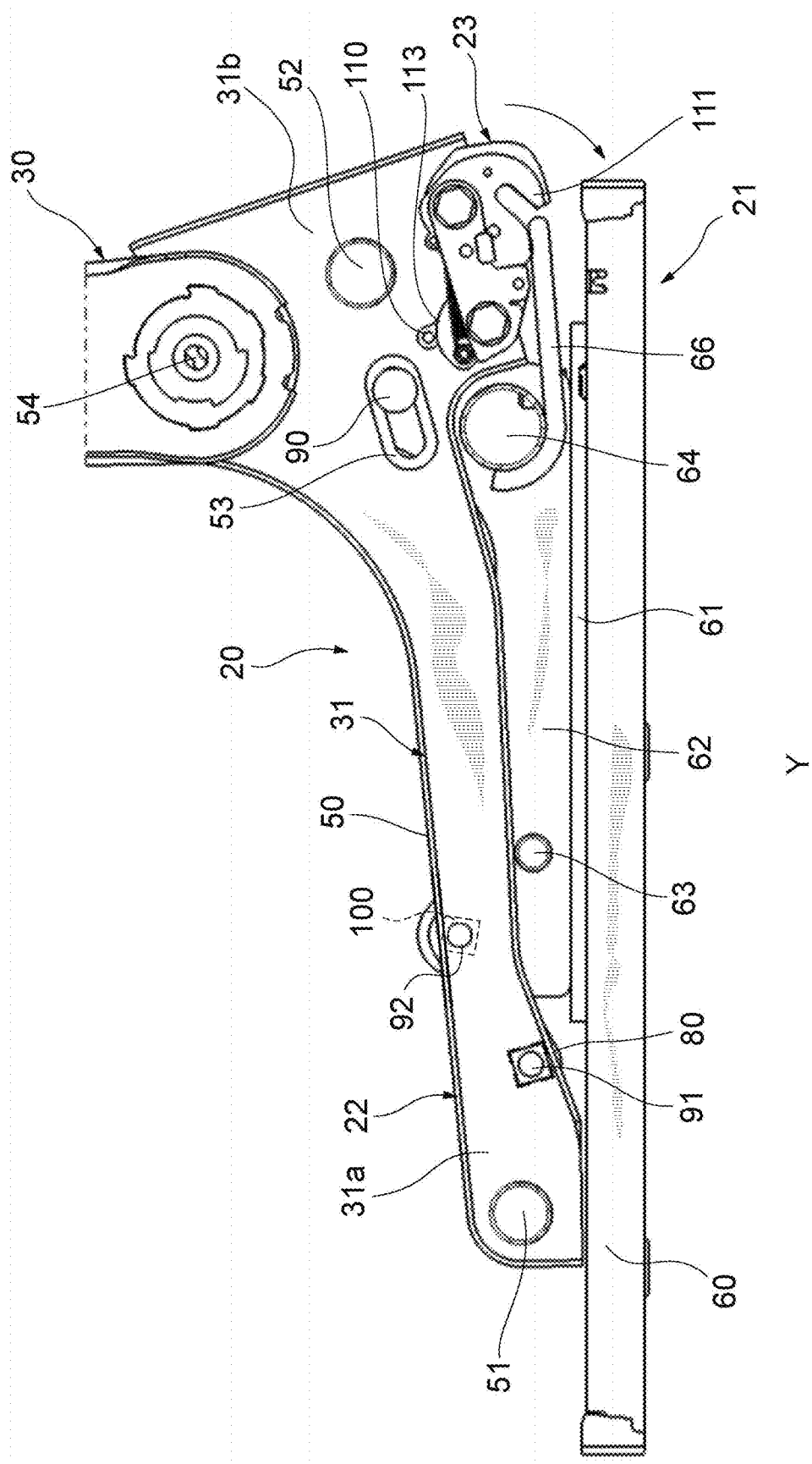
FIG. 8 is a side view showing the main frame in the forward tilted position from the inside.

Strikers 66 functioning as held members held by hooks 111 of the lock mechanisms 23, which are described hereinafter, are fixed to the rear connecting frame 64. The strikers 66 are provided in the vicinity of both ends of the rear connecting frame 64 in the lateral direction X, respectively. As shown in FIGS. 7 and 8, the strikers 66 are each configured to extend backward from the rear connecting frame 64, bend inward in the lateral direction X, and extend in the lateral direction X.

Figure 4:
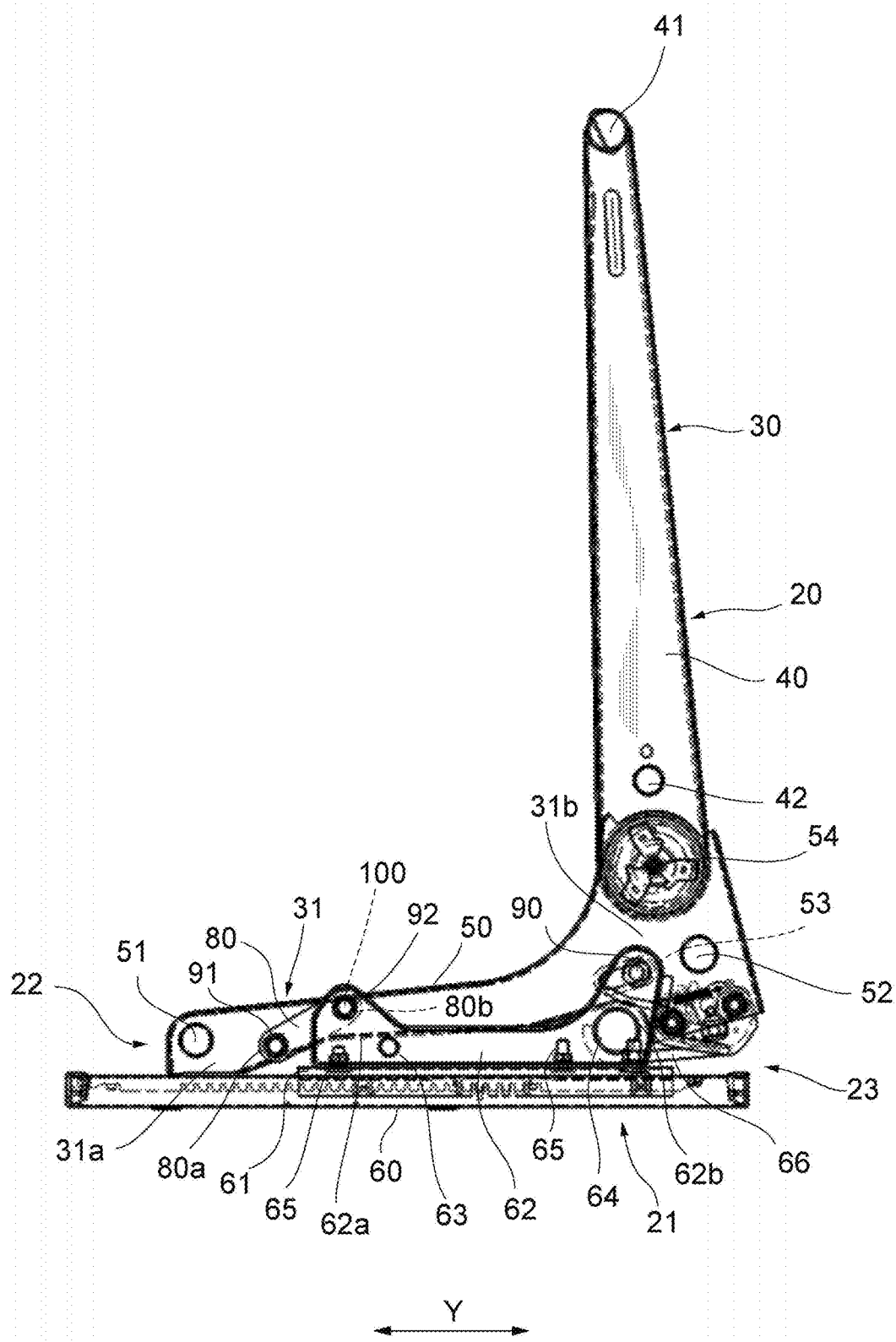
FIG. 4 is a side view showing an example of the framework of the vehicle seat in which the main frame is in a forward tilted position.

As shown in FIG. 2, the link mechanisms 22 realize a so-called pitching function, and are provided in pairs on both the left and right sides of the main frame 20. As shown in FIGS. 3 and 4, each of the link mechanisms 22 is, for example, a 4-link slider mechanism and has the side frame 50 of the cushion frame 31, the riser 62, the front link 80, and the first rotating shaft 90 moving inside the long hole 53.

A rear portion 31b of the cushion frame 31 (side frame 50) and a rear portion 62b of each riser 62 are rotatably connected to each other via the first rotating shaft 90. The first rotating shaft 90 is provided in the long hole 53 of the cushion frame 31 in a swingable manner. A front portion 31*a* of the cushion frame 31 and a first end portion 80*a* of each front link 80 are rotatably connected to each other via a second rotating shaft 91. A front portion 62*a* of each riser 62 and a second end portion 80*b* of each front link 80 are rotatably connected to each other via the third rotating shaft 92.

Each link mechanism 22 is configured such that, when the front link 80 rotates forward (counterclockwise in FIGS. 3 and 4) about the third rotating shaft 92 with respect to the riser 62, the front portion 31*a* of the cushion frame 31 drops while moving forward, the first rotating shaft 90 moves to the rear side in the long hole 53, and the rear portion 31*b* of the cushion frame 31 rises while moving forward, whereby the main frame 20 is brought to the forward tilted position (the state shown in FIG. 4). When the main frame 20 tilts forward by a predetermined amount, the cushion frame 31 comes into abutment with the front connecting frame 63, stopping the forward tilting motion of the main frame 20.

Each link mechanism 22 is also configured such that, when the front link 80 rotates backward (clockwise in FIGS. 3 and 4) about the third rotating shaft 92 with respect to the riser 62, the front portion 31*a* of the cushion frame 31 rises while moving backward, the first rotating shaft 90 moves to the front side in the long hole 53, and the rear portion 31*b* of the cushion frame 31 drops while moving backward, whereby the main frame 20 is brought back to the seated position (the state shown in FIG. 3).

Figure 5:
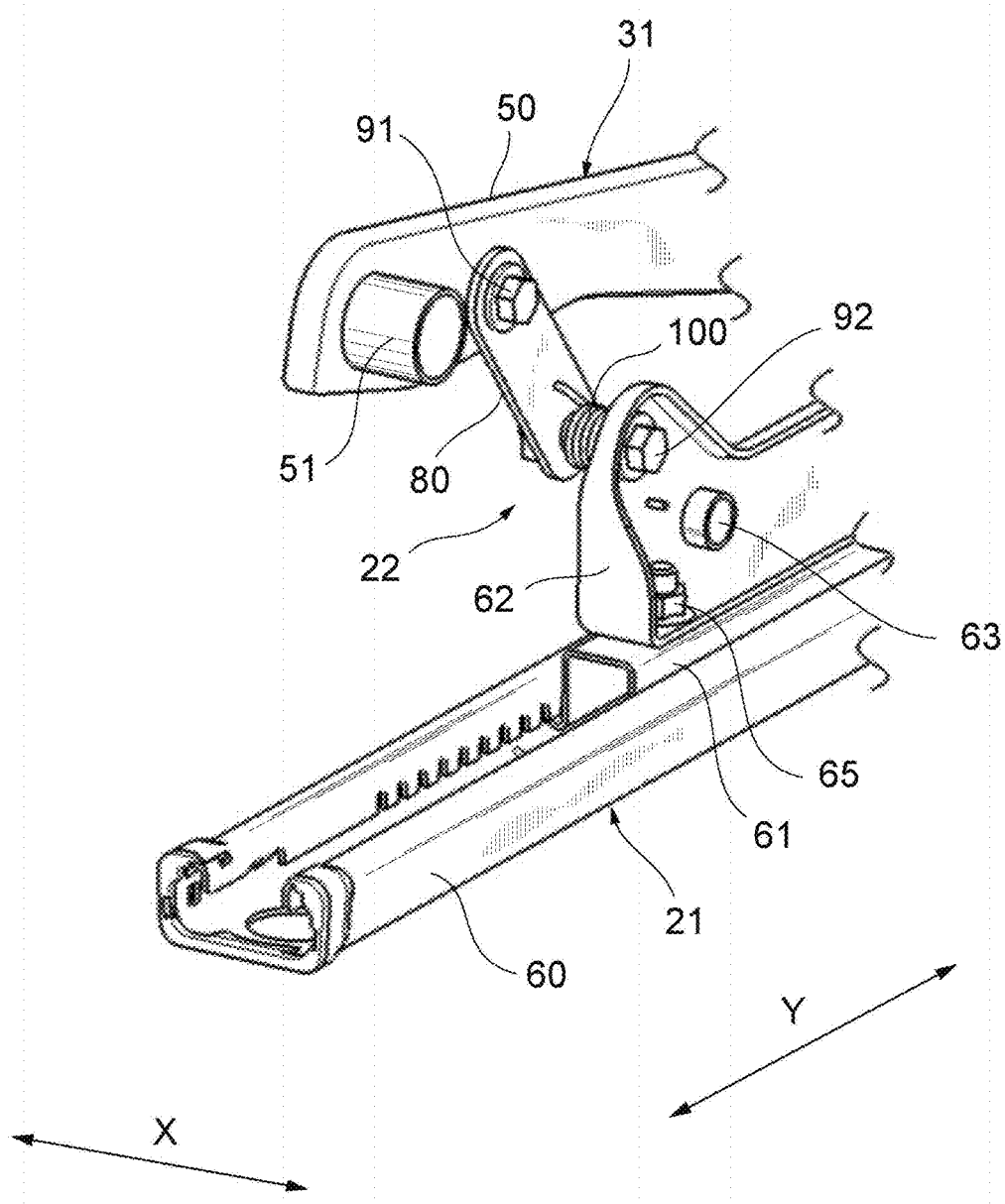
FIG. 5 is a perspective view showing a configuration around a torsion spring of a link mechanism.
Figure 6:
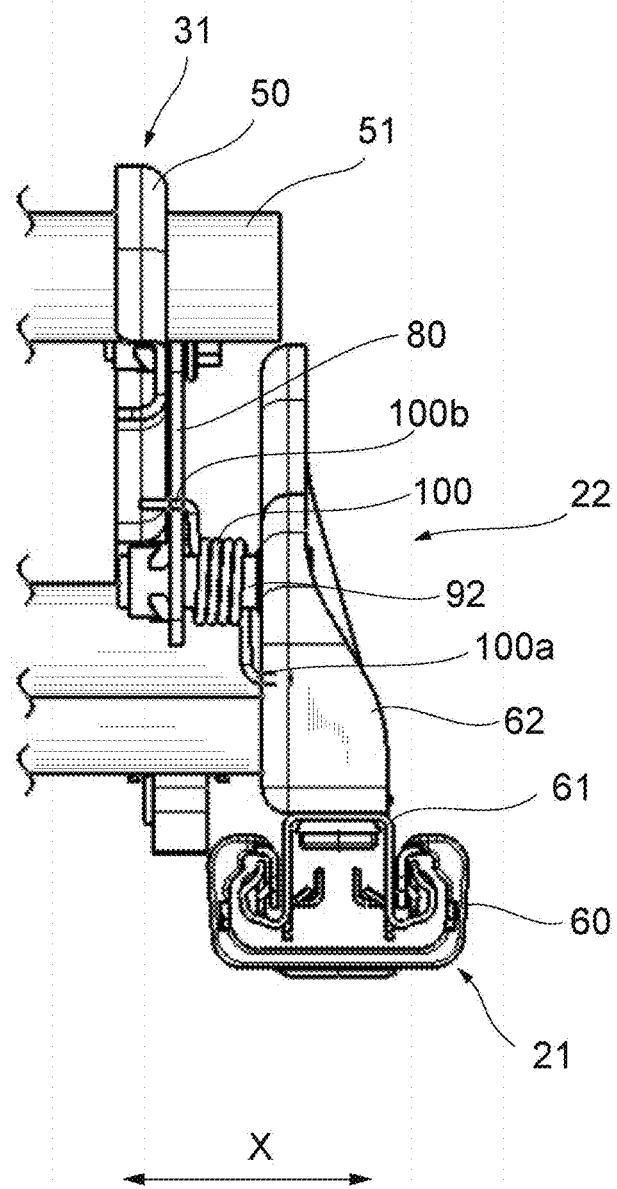
FIG. 6 is a front view of the configuration around the torsion spring of the link mechanism.

As shown in FIGS. 5 and 6, the cushion frame 31 is located inside the lower rail 60, the upper rail 61, and the riser 62 in the lateral direction X. The front link 80 is disposed between the riser 62 and the cushion frame 31 in the lateral direction X.

The third rotating shaft 92 of the riser 62 is provided with a torsion spring 100 that urges the main frame 20 to swing from the forward tilted position to the seated position. The torsion spring 100 is wound around the third rotating shaft 92 located between the riser 62 and the front link 80, has a first end portion 100*a* fixed to the riser 62, and a second end portion 100*b* to the front link 80. When the main frame 20 moves to the forward tilted position, the front link 80 rotates forward around the third rotating shaft 92, and the urging force of the torsion spring 100 becomes stronger. When the main frame 20 returns to the seated position, such movement is assisted by the urging force of the torsion spring 100.

Each lock mechanism 23 shown in FIG. 2 not only fixes the main frame 20 in the seated position with respect to the base frame 21, but also releases this fixed state. The lock mechanisms 23 are provided in pairs on both the left and right sides of the main frame 20. The lock mechanisms 23 are each provided inside the cushion frame 31 in the lateral direction X at, for example, a lower rear portion of the cushion frame 31.

FIGS. 7 and 8 are each a diagram of the cushion frame 31 viewed from the inside in the lateral direction X. Each lock mechanism 23 includes, for example, an unlocking member 110 that works with an unlocking lever (not shown), the hook 111 that can be switched between a hooked state and an unhooked state by the unlocking member 110, and the like.

The unlocking member 110 is configured to be rotatable in, for example, the front-rear direction Y of the cushion frame 31. The unlocking member 110 is urged toward the rear side of the cushion frame 31 by a spring 113. Each lock mechanism 23 is configured such that, when the unlocking lever is moved, the unlocking member 110 moves forward, and the hook 111 is released from the hooked state by a cam mechanism, axially freeing the hook 111. According to this configuration, when the main frame 20 is tilted forward, the hook 111 is pushed by the striker 66 in an opening direction (counterclockwise in FIGS. 7 and 8) to rotate, whereby the striker 66 is removed from the hook 111 (the state shown in FIG. 8).

Each lock mechanism 23 is also configured such that, when the main frame 20 is tilted backward, the hook 111 is pushed by the striker 66 in a closing direction (clockwise in FIGS. 7 and 8) to rotate, and the striker 66 is held by the hook 111, bringing the hook 111 to the hooked state (the state shown in FIG. 7). At this moment, the unlocking member 110 is returned to the original position thereof by the action of the spring 113.

As shown in FIG. 2, the seat belt device 13 includes a retractor 121 that is disposed inside the seatback 11 and reels a seat belt 120, a belt in/out frame 122 that is disposed inside a shoulder portion of the seatback 11 and pulls the seat belt 120 into and out of the seatback 11, a buckle portion 123 for fastening the seat belt 120, and the like. The retractor 121 and the belt in/out frame 122 are attached to an upper portion of the back frame 30. The belt in/out frame 122 is provided, for example, in the vicinity of one end portion of the upper connecting frame 41 in the lateral direction X. As shown in FIG. 1, the seatback 11 is provided with a belt in/out opening 124 at a position corresponding to the belt in/out frame 122.

The operation of the pitching function of the vehicle seat 1 configured as described above is described next. First, as shown in FIG. 3, the main frame 20 of the vehicle seat 1 is in the seated position, which is a normal position of the main frame 20. At this moment, as shown in FIG. 7, the hook 111 of the lock mechanism 23 on the main frame 20 side holds the striker 66 on the base frame 21 side, and the main frame 20 is locked in the seated position. In addition, the urging force of the torsion spring 100 bringing the main frame 20 from the forward tilted position back to the seated position acts on the main frame 20.

Then, in a case where the occupant uses the pitching function of the vehicle seat 1, when the occupant first moves the unlocking lever of the lock mechanism 23, the unlocking member 110 moves forward and thereby the hooked state of the hook 111 is released, bringing the hook 111 to the unhooked state. Next, the occupant pushes the seatback 11 forward, and tilts the seatback 11 and the seat cushion 10 integrally forward. In so doing, the striker 66 is removed from the hook 111 as shown in FIG. 8, and the main frame 20 is tilted forward with respect to the base frame 21 by the link mechanism 22 and is brought to the forward tilted position as shown in FIG. 4. The main frame 20 stops tilting forward as soon as the side frame 50 of the cushion frame 31 comes into abutment with the front connecting frame 63. In this manner, a space is created behind the seatback 11, to allow, for example, the occupant to get into the rear row seat.

Then, when bringing the seatback 11 and the seat cushion 10 back to the normal position thereof, the occupant pushes the seatback 11 backward, and the main frame 20 tilts backward with respect to the base frame 21 as shown in FIG. 3. In so doing, the torsion spring 100 applies the urging force thereof to swing the main frame 20 from the forward tilted position to the seated position, assisting the occupant in bringing the seatback 11 and the seat cushion 10 (the main frame 20) back to the normal seated position. Then, when the main frame 20 is brought back to the seated position, the striker 66 pushes the hook 111 of the lock mechanism 23, and the hook 111 rotates to hold the striker 66 as shown in FIG. 7. In this manner, the main frame 20 is locked again in the seated position.

According to the present embodiment, the torsion spring 100 provided on the third rotating shaft 92 of the link mechanism 22 can urge the main frame 20 to swing from the forward tilted position to the seated position. Therefore, the vehicle seat 1 with the pitching function not only has the assist function for bringing the main frame 20 back to the seated position but also keeps the lateral width and the weight of the seat 1 small.

Since the torsion spring 100 is provided on each of the pair of left and right third rotating shafts 92 of the link mechanism 22, the torsion spring 100 can assist the main frame 20 in returning to the seated position thereof in a well-balanced manner on both the left and right sides of the main frame 20.

Since the torsion spring 100 is provided at a position inside the lower rail 60 in the lateral direction X, the lateral width of the vehicle seat 1 can be further kept small. Note that the torsion spring 100 may be provided at the same position as the lower rail 60 as viewed from the front.

The link mechanisms 22 each have the cushion frame 31, the riser 62, and the front link 80, wherein the rear portion 31b of the cushion frame 31 and the rear portion 62b of the riser 62 are connected to each other via the first rotating shaft 90, the front portion 31a of the cushion frame 31 and the first end portion 80a of the front link 80 are connected to each other via the second rotating shaft 91, and the front portion 62a of the riser 62 and the second end portion 80b of the front link 80 are connected to each other via the third rotating shaft 92, and the cushion frame 31 is provided with the long hole 53 that allows the first rotating shaft 90 to swing. The torsion spring 100 is provided on the third rotating shaft 92. Therefore, the pitching function of the vehicle seat 1 having a small number of parts and excellent strength and rigidity can be realized. Furthermore, the assist function of the torsion spring 100 can favorably be realized.

In the present embodiment, the torsion spring 100 may be provided on the second rotating shaft 91. The torsion spring 100 may also be provided on both the third rotating shaft 92 and the second rotating shaft 91.

Figure 9:
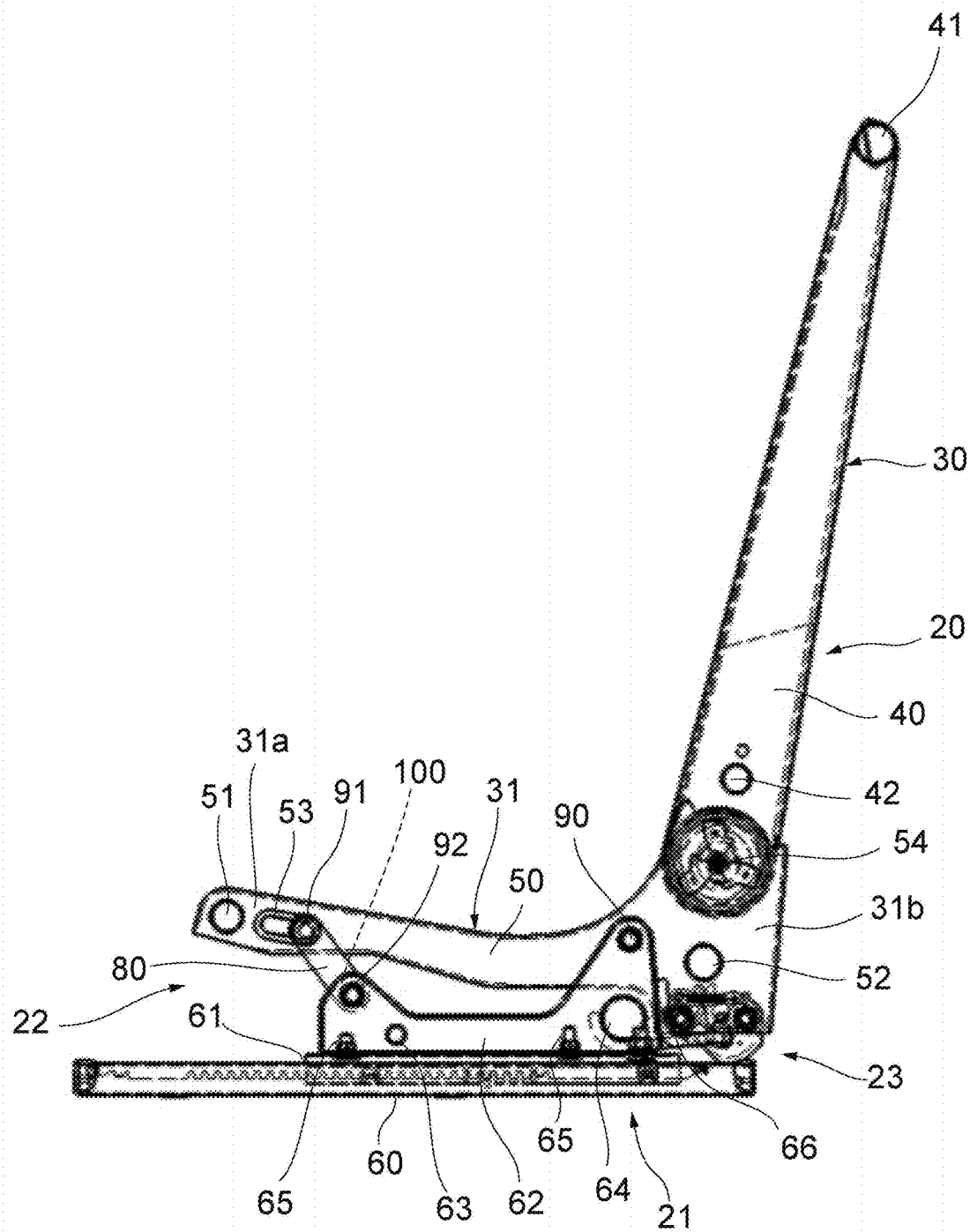
FIG. 9 is a side view showing the main frame of another link mechanism, the main frame being in the seated position.

In each of the link mechanisms 22 of the present embodiment, the cushion frame 31 is provided with the long hole 53 that allows the first rotating shaft 90 to swing, but the long hole 53 that allows the second rotating shaft 91 to swing may be provided in the front portion 31a of the cushion frame 31, as shown in FIG. 9. In this case, the torsion spring 100 may be provided on at least either the third rotating shaft 92 or the first rotating shaft 90.

Figure 10:
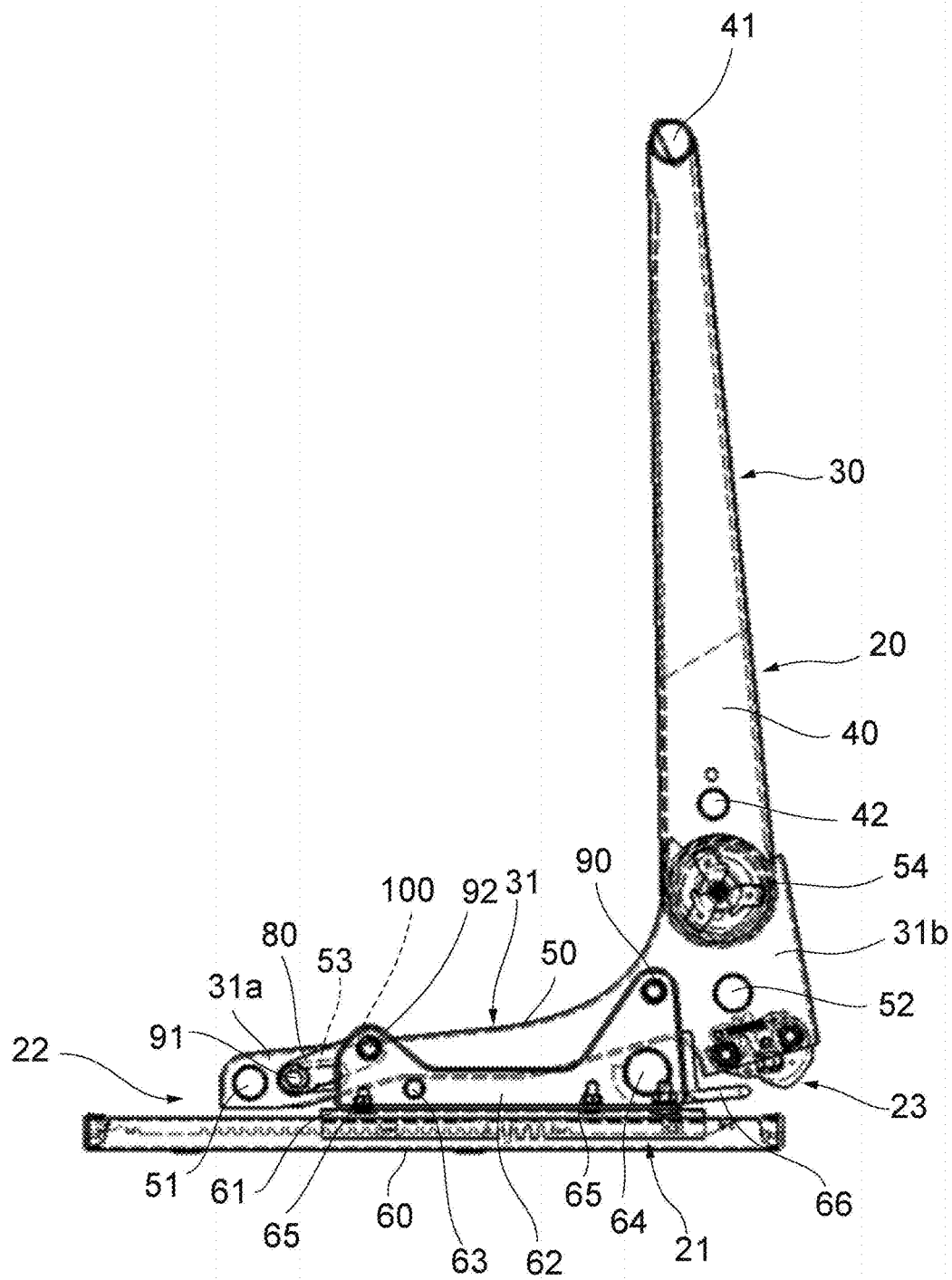
FIG. 10 is a side view showing the main frame of another link mechanism, the main frame being in the forward tilted position.

In this example, when the front link 80 rotates forward (counterclockwise in FIGS. 9 and 10) about the third rotating shaft 92 with respect to the riser 62, the front portion 31a of the cushion frame 31 drops while moving forward, the second rotating shaft 91 moves to the front side in the long hole 53, and the rear portion 31b of the cushion frame 31 rises while moving forward, whereby the main frame 20 is brought to the forward tilted position (the state shown in FIG. 10).

Also, when the front link 80 rotates backward (clockwise in FIGS. 9 and 10) about the third rotating shaft 92 with respect to the riser 62, the front portion 31a of the cushion frame 31 rises while moving backward, the second rotating shaft 91 moves to the rear side in the long hole 53, and the rear portion 31b of the cushion frame 31 drops while moving backward, whereby the main frame 20 is brought to the seated position (the state shown in FIG. 9).

Figure 11:
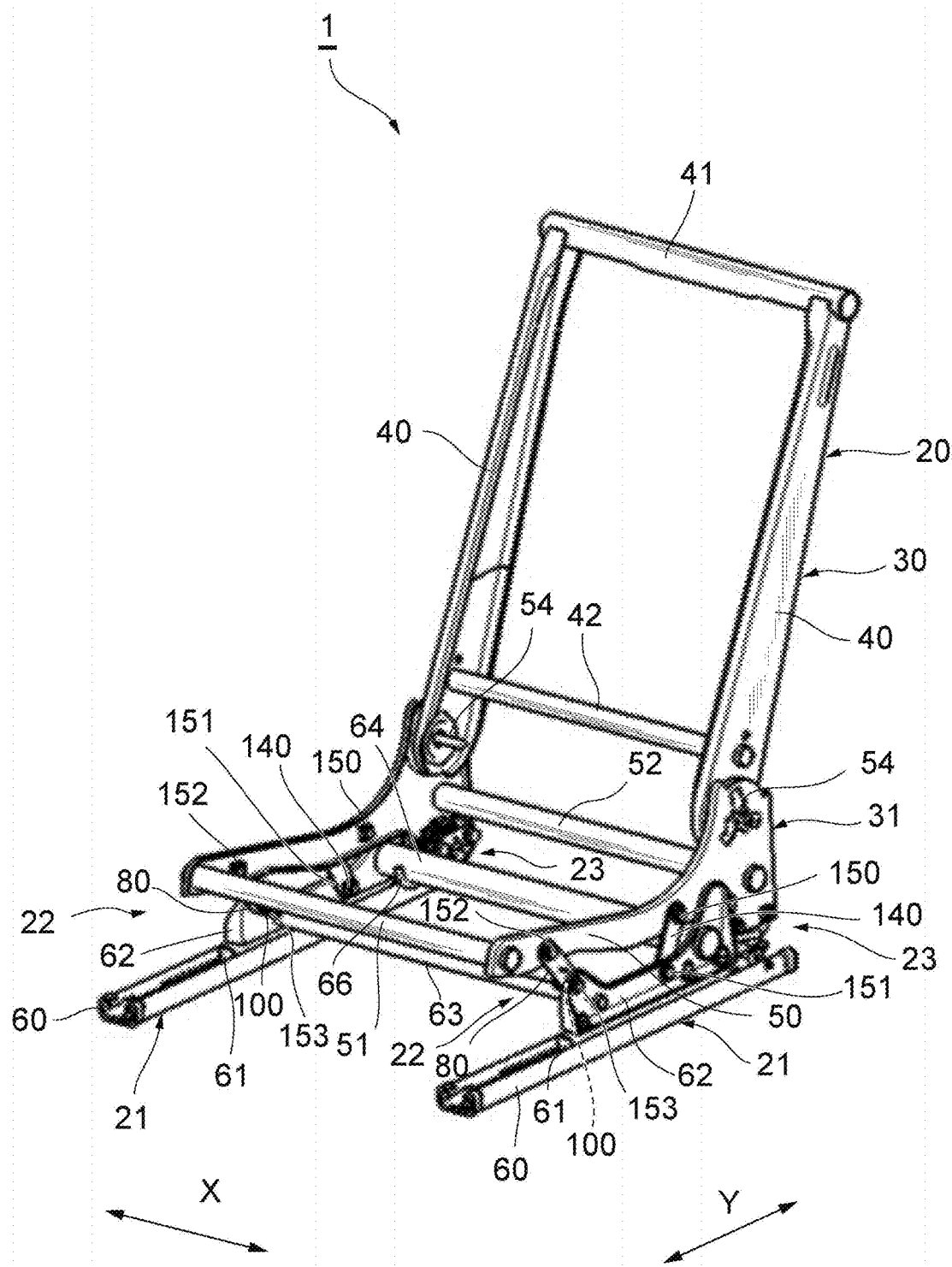
FIG. 11 is a perspective view showing a framework of a vehicle seat of another link mechanism.

In the foregoing embodiment, the link mechanisms 22 are each a four-link slider mechanism, but may also be a link mechanism having other configuration. For example, each link mechanism 22 may be a four-link mechanism such as the one shown in FIG. 11. Such link mechanism 22 has, for example, the cushion frame 31, the riser 62, the front link 80, and a rear link 140, wherein the rear portion 31b of the cushion frame 31 and a first end portion of the rear link 140 are connected to each other via a first rotating shaft 150, a second end portion of the rear link 140 and the rear portion 62b of the riser 62 are connected to each other via a second rotating shaft 151, the front portion 31a of the cushion frame 31 and the first end portion 80a of the front link 80 are connected to each other via a third rotating shaft 152, and the front portion 62a of the riser 62 and the second end portion 80b of the front link 80 are connected to each other via a fourth rotating shaft 153. The torsion spring 100 may be provided on at least any one of the first to fourth rotating shafts 150 to 153.

Although preferred embodiments of the present invention have been described above with reference to the accompanying drawings, the present invention is not limited thereto. It is clear that a person skilled in the art can come up with various modifications or corrections within the scope of the ideas described in the claims, and it is understood that such modifications and corrections belong to the technical scope of the present invention.

For example, the configurations of the main frame 20, the base frame 21, and the lock mechanisms 23, and the configuration of the seat belt device 13, are not limited to those described in the above embodiments, and therefore may have other configurations. Furthermore, the spring 100 may be a different spring as long as it urges the main frame 20 to swing from the forward tilted position to the seated position. In addition, in the above embodiments, the spring 100 urges the main frame 20 to swing from the forward tilted position to the seated position, but may urge the main frame 20 to swing from the seated position to the forward tilted position. In this case, the configurations described in the above embodiments can be adopted as the configuration of the vehicle seat other than the configuration of the spring 100.

The present invention is useful in a vehicle seat with the pitching function that not only has the assist function for bringing the main frame to the seated position or the forward tilted position but also prevents the increase in the lateral width and the weight of the seat.

What is claimed is:
1. A vehicle seat, comprising:
a base frame;
a main frame disposed on the base frame and having a back frame and a cushion frame;
a link mechanism that allows the main frame to swing to a seated position and a forward tilted position with respect to the base frame;
and
a spring that urges the main frame to swing from the forward tilted position to the seated position or from the seated position to the forward tilted position,
wherein:
the base frame has a first frame extending in a front-rear direction,
the link mechanism has the cushion frame, the first frame, and a front link,
a rear portion of the cushion frame and a rear portion of the first frame are connected to each other via a first rotating shaft, a front portion of the cushion frame and a first end portion of the front link are connected to each other via a second rotating shaft, a front portion of the first frame and a second end portion of the front link are connected to each other via a third rotating shaft, the cushion frame is provided with a long hole that corresponds to and allows either the first rotating shaft or the second rotating shaft to swing, and the spring is provided on at least the third rotating shaft, or the first or second rotating shaft which the long hole does not allow to swing.

2. The vehicle seat according to claim 1, wherein
the link mechanism is provided in pairs on both left and right sides of the main frame, and
the spring is provided on each of a pair of left and right rotating shafts of the link mechanism.

3. The vehicle seat according to claim 1, wherein
the base frame has slide rails that are located on both left and right sides of the main frame respectively and that slide the main frame in a front-rear direction, and
the spring is provided at the same position as the slide rail in a front view or at a position on an inside of the slide rail in a left and right direction.

4. A vehicle seat, comprising:
a base frame;
a main frame disposed on the base frame and having a back frame and a cushion frame;
a link mechanism that allows the main frame to swing to a seated position and a forward tilted position with respect to the base frame; and
a spring that urges the main frame to swing from the forward tilted position to the seated position or from the seated position to the forward tilted position, wherein
the base frame has a first frame extending in a front-rear direction,
the link mechanism has the cushion frame, the first frame, and a front link,
a rear portion of the cushion frame and a rear portion of the first frame are connected to each other via a first rotating shaft,
a front portion of the cushion frame and a first end portion of the front link are connected to each other via a second rotating shaft,
a front portion of the first frame and a second end portion of the front link are connected to each other via a third rotating shaft, and
the cushion frame is provided with a long hole that allows either the first rotating shaft or the second rotating shaft to swing.

5. The vehicle seat according to claim 4, wherein the spring is provided on at least the third rotating shaft, or the first or second rotating shaft which the long hole does not allow to swing.

6. The vehicle seat according to claim 4, wherein
the link mechanism is provided in pairs on both left and right sides of the main frame, and
the spring is provided on each of a pair of left and right rotating shafts of the link mechanism.

7. The vehicle seat according to claim 4, wherein
the base frame has slide rails that are located on both left and right sides of the main frame respectively and that slide the main frame in a front-rear direction, and
the spring is provided at the same position as the slide rail in a front view or at a position on an inside of the slide rail in a left and right direction.

* * * * *